(12) United States Patent
Kraynev et al.

(10) Patent No.: US 8,398,524 B2
(45) Date of Patent: Mar. 19, 2013

(54) MULTI-SPEED TRANSMISSION WITH EIGHT TORQUE-TRANSMITTING MECHANISMS

(75) Inventors: Alexander Filippovich Kraynev, Moscow (RU); Vladimir Konstantinovich Astashev, Moscow (RU); Konstantin Borisovich Salamandra, Moscow (RU); Madhusudan Raghavan, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 186 days.

(21) Appl. No.: 12/954,928

(22) Filed: Nov. 29, 2010

(65) Prior Publication Data

US 2011/0230302 A1     Sep. 22, 2011

(30) Foreign Application Priority Data

Mar. 19, 2010   (RU) .............................. 2010110532

(51) Int. Cl.
*F16H 3/44* (2006.01)
(52) U.S. Cl. ........................................ 475/302; 475/218
(58) Field of Classification Search ................. 475/302, 475/207, 218
See application file for complete search history.

(56) References Cited

U.S. PATENT DOCUMENTS

| | | | | |
|---|---|---|---|---|
| 3,589,483 A | * | 6/1971 | Smith | .......................... 192/3.52 |
| 4,070,927 A | | 1/1978 | Polak | |
| 4,709,594 A | | 12/1987 | Maeda | |
| 5,106,352 A | | 4/1992 | Lepelletier | |

(Continued)

FOREIGN PATENT DOCUMENTS

| | | |
|---|---|---|
| DE | 10232838 A1 | 2/2004 |
| EP | 1624232 A1 | 2/2006 |

(Continued)

OTHER PUBLICATIONS

Masami Kondo, Yoshio Hasegawa, Yoji Takanami, Kenji Arai, Masaharu Tanaka, Masafumi Kinoshita, Takeshi Ootsuki, Tetsuya Yamaguchi, Akira Fukatsu, "Toyota AA80E 8-Speed Automatic Transmission with Novel Powertrain Control System", SAE Technical Paper Series, Apr. 16-19, 2007, 2007-01-1311, Warrendale, PA 15096-0001 USA.

(Continued)

*Primary Examiner* — David D Le
*Assistant Examiner* — Erin D Bishop
(74) *Attorney, Agent, or Firm* — Quinn Law Group, PLLC

(57) ABSTRACT

A transmission includes an input member, an output member, an intermediate shaft, and a simple planetary gear set, all of which are coaxial. A first and a second layshaft are arranged to define a second axis of rotation and a third axis of rotation, respectively. The transmission has five sets of intermeshing gears, some of which are arranged to transfer torque from the input member to the layshafts, and others of which are arranged to transfer torque from the layshafts to the intermediate member or the simple planetary gear set. The transmission has eight torque-transmitting mechanisms, including one torque-transmitting mechanism that is selectively engagable to connect the input member for common rotation with the intermediate member. The other seven torque-transmitting mechanisms are each selectively engagable to connect a different respective gear of the sets of intermeshing gears to a respective one of the layshafts or to a stationary member.

18 Claims, 1 Drawing Sheet

U.S. PATENT DOCUMENTS

| | | | |
|---|---|---|---|
| 5,385,064 | A | 1/1995 | Reece |
| 5,497,867 | A | 3/1996 | Hirsch et al. |
| 5,560,461 | A | 10/1996 | Loeffler |
| 5,599,251 | A | 2/1997 | Beim et al. |
| 5,641,045 | A | 6/1997 | Ogawa et al. |
| 5,651,435 | A | 7/1997 | Perosky et al. |
| 5,975,263 | A | 11/1999 | Forsyth |
| 6,053,839 | A | 4/2000 | Baldwin et al. |
| 6,071,208 | A | 6/2000 | Koivunen |
| 6,083,135 | A | 7/2000 | Baldwin et al. |
| 6,217,474 | B1 | 4/2001 | Ross et al. |
| 6,354,416 | B1 | 3/2002 | Eo |
| 6,375,592 | B1 | 4/2002 | Takahashi et al. |
| 6,422,969 | B1 | 7/2002 | Raghavan et al. |
| 6,425,841 | B1 | 7/2002 | Haka |
| 6,471,615 | B1 | 10/2002 | Naraki et al. |
| 6,558,287 | B2 | 5/2003 | Hayabuchi et al. |
| 6,623,397 | B1 | 9/2003 | Raghavan et al. |
| 6,840,885 | B2 | 1/2005 | Yi et al. |
| 2006/0014603 | A1 | 1/2006 | Raghavan et al. |
| 2006/0025272 | A1 | 2/2006 | Pelouch |
| 2008/0190228 | A1* | 8/2008 | Long et al. ............ 74/331 |

FOREIGN PATENT DOCUMENTS

| | | |
|---|---|---|
| JP | 09-126283 A | 5/1997 |
| RU | 2183295 C2 | 6/2002 |
| WO | 2003025431 A1 | 3/2003 |
| WO | 2006032312 A1 | 3/2006 |
| WO | 2006074707 A1 | 7/2006 |

OTHER PUBLICATIONS

Hirofumi Ota, Kazutoshi, Nozaki, Atsushi Honda, Masafumi Kinoshita, Toshihiko Aoki, Minoru Todo, Mikio Iwase, "Toyota's World First 8-Speed Automatic Transmission for Passenger Cars", SAE Technical Paper Series, Apr. 16-19, 2007, 2007-01-1101, Warrendale, PA 15096-0001 USA.

* cited by examiner

| Gear State | Speed Ratio | Ratio Step | C1 | C2 | C3 | C4 | C5 | C6 | C7 | C8 |
|---|---|---|---|---|---|---|---|---|---|---|
| 1 | 9.10 |  | X |  |  | X |  |  |  |  |
| (2) | 4.98 | 1.83 |  |  |  |  |  | X | X |  |
| 3 | 4.06 | 1.23 | X |  | X |  |  |  |  |  |
| 4 | 3.36 | 1.21 |  | X |  |  |  | X |  |  |
| 5 | 3.00 | 1.12 | X |  |  |  |  |  |  | X |
| 6 | 2.46 | 1.22 |  |  |  | X |  | X |  |  |
| 7 | 1.84 | 1.34 |  |  | X |  |  | X |  |  |
| (8) | 1.75 | 1.05 |  |  |  |  | X | X |  |  |
| 9 | 1.50 | 1.16 |  | X |  |  |  | X |  |  |
| 10 | 1.29 | 1.16 |  |  |  | X | X |  |  |  |
| 11 | 1.10 | 1.17 |  |  | X |  | X |  |  |  |
| 12 | 1.00 | 1.10 |  |  |  |  |  | X |  | X |
| 13 | 0.27 | 3.70 |  |  |  |  |  | X |  | X |
| R | -10.55 |  | X |  |  |  |  |  | X |  | x = Engaged State

MULTI-SPEED TRANSMISSION WITH EIGHT TORQUE-TRANSMITTING MECHANISMS

CROSS-REFERENCE TO RELATED APPLICATION

This application claims the benefit of Russian Patent Application No. 2010110532, filed Mar. 19, 2010.

TECHNICAL FIELD

The invention relates to a multi-speed planetary transmission with layshafts having gears establishing five sets of intermeshing transfer gears, and with a simple planetary gear set.

BACKGROUND OF THE INVENTION

Automotive vehicles include a powertrain that is comprised of an engine, a multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising other than the most efficient point. Therefore, manually-shifted (layshaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improved the shift quality of the transmission by making the ratio interchanges substantially imperceptible to the operator under normal vehicle acceleration.

Multi-speed transmissions with greater than four speed ratios provide further improvements in acceleration and fuel economy over three- and four-speed transmissions. However, typical increased complexity, size and cost of such transmissions are competing factors which may prevent their use in some applications.

SUMMARY OF THE INVENTION

A multi-speed transmission is provided that utilizes a simple planetary gear set and torque transfer using sets of intermeshing gears and layshafts. The transmission includes an input member, an output member, and an intermediate shaft, all of which are coaxial. A stationary member, such as a transmission casing, is provided. The transmission further includes a simple planetary gear set. The input member, the output member, the intermediate shaft, and the simple planetary gear set are arranged coaxially with one another to define a first axis of rotation. A first and a second layshaft define a second axis of rotation and a third axis of rotation, respectively. Eight selectively engagable torque-transmitting mechanisms, such as clutches, are engaged to transfer torque to establish the various speed ratios. As used herein, a "clutch" means a rotating-type clutch, or a stationary-type clutch, otherwise referred to as a brake. Different ones of the clutches may be friction clutches, synchronizers, band clutches, a selectively engagable one-way clutch, a dog clutch, or other types of clutches.

Five sets of intermeshing gears are provided, some of which are arranged to transfer torque from the input member to the layshafts, and others of which are arranged to transfer torque from the layshafts to either the intermediate member or the simple planetary gear set. The sets of intermeshing gears are also referred to as transfer gears. Each set of intermeshing gears is axially spaced from the other sets of intermeshing gears. The eight torque-transmitting mechanisms include one torque-transmitting mechanism that is selectively engagable to connect the input member for common rotation with the intermediate member. The other seven torque-transmitting mechanisms are each selectively engagable to connect a different respective gear of the sets of intermeshing gears to a respective one of the layshafts or to the stationary member. The eight torque-transmitting mechanisms are engagable in different combinations to establish multiple forward speed ratios and a reverse speed ratio between the input member and the output member. As used herein, "common rotation" means rotation at the same speed (i.e., no relative rotation). As used herein, "gear ratio" is the ratio of the torque of the output member to the torque of the input member, while "speed ratio" is the ratio of the speed of the input member to the speed of the output member.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figures 1, 2:
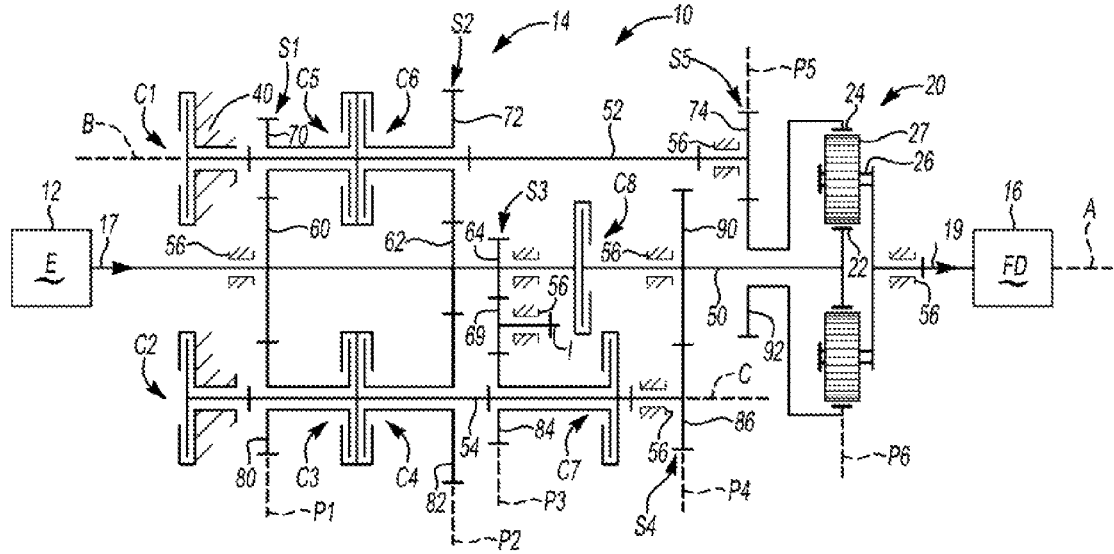
FIG. 1 is a schematic illustration in stick diagram form of a powertrain having a multi-speed transmission.
FIG. 2 is a truth table depicting some of operating characteristics of the transmission shown in FIG. 1.

Referring to the drawings, wherein like reference numbers refer to like components, FIG. 1 shows the powertrain 10 with an engine 12 (labeled E), a combination layshaft and planetary transmission 14, and a final drive mechanism 16 (labeled FD). The engine 12 may be powered by various types of fuel to improve the efficiency and fuel economy of a particular application. Such fuels may include, for example gasoline, diesel, an ethanol, dimethyl ether, etc. The transmission 14 includes an input member 17 continuously connected with an output member of the engine 12, such as a crankshaft, optionally through a torque converter. The transmission 14 further includes five sets of intermeshing gears, described below, an intermediate member 50, a first layshaft 52, a second layshaft 54, a first planetary gear set 20, and an output member 19 connected with the final drive mechanism 16 for providing propulsion power to vehicle wheels.

The simple planetary gear set 20 includes a sun gear member 22, a ring gear member 24, and a carrier member 26 that rotatably supports a set of pinion gears 27. The pinion gears 27 mesh with sun gear member 22 and ring gear member 24. The sun gear member 22 is referred to as the first member of the simple planetary gear set 20 and is connected for common rotation with the intermediate member 50. The carrier member 26 is referred to as the second member of the simple planetary gear set 20 and is connected for common rotation with the output member 19. The ring gear member 24 is referred to as the third member of the planetary gear set 20 and is connected for common rotation with gear 92.

The transmission 14 includes multiple shafts arranged to define three different axes of rotation A, B, and C. The input member 17, the output member 19, the intermediate member 50, and the planetary gear set 20 are coaxial and define a first axis of rotation A. A first layshaft 52 and a second layshaft 54 are spaced parallel to the first axis of rotation A, and define a second axis of rotation B, and a third axis of rotation C, respectively.

A first set S1 of intermeshing gears includes gears 70, 60, and 80, which mesh in a first gear plane P1. Gear 60 is connected for rotation with input member 17. Gear 70 meshes with gear 60, and rotates concentrically about layshaft 52. Gear 80 meshes with gear 60 and rotates concentrically about layshaft 54. The input member 17, layshafts 52 and 54, intermediate member 50, and output member 19 are supported for rotation by grounded bearings 56.

A second set S2 of intermeshing gears includes gears 72, 62, and 82, which mesh in a second gear plane P2. Gear 62 is connected for rotation with input member 17. Gear 72 meshes with gear 62, and rotates concentrically about layshaft 52. Gear 82 meshes with gear 62 and rotates concentrically about layshaft 54.

A third set S3 of intermeshing gears includes gears 64, 69, and 84, which mesh in a third gear plane P3. Gear 64 is connected for rotation with input member 17. Gear 69 meshes with gear 64, and is connected for rotation with idler shaft I. Gear 84 meshes with gear 69 and rotates concentrically about layshaft 54.

A fourth set S4 of intermeshing gears includes gears 90 and 86, which mesh in a fourth gear plane P4. Gear 90 is connected for rotation with intermediate member 50. Gear 86 meshes with gear 90 and is connected for rotation with layshaft 54.

A fifth set S5 of intermeshing gears includes gears 74 and 92, which mesh in a fifth gear plane P5. Gear 74 is connected for rotation with layshaft 52. Gear 92 meshes with gear 74 and is connected for rotation with ring gear member 24.

The sun gear member 22, ring gear member 24 and pinion gears 27 of the planetary gear set 20 mesh in a sixth gear plane P6. The gear planes P1-P6 extend perpendicular to the drawing sheet in FIG. 1.

The transmission 14 further includes eight torque-transmitting mechanisms: a first torque-transmitting mechanism C1, a second torque-transmitting mechanism C2, a third torque-transmitting mechanism C3, a fourth torque-transmitting mechanism C4, a fifth torque-transmitting mechanism C5, a sixth torque-transmitting mechanism C6, a seventh torque-transmitting mechanism C7, and an eighth torque-transmitting mechanism C8. Torque-transmitting mechanisms C3, C4, C5, C6, C7 and C8 are rotating-type clutches. Torque-transmitting mechanisms C1 and C2 are stationary-type clutches, also referred to as brakes. Torque-transmitting mechanism C8, as well as the torque-transmitting mechanisms C1, C5, and C6 that are concentric with layshaft 52, may be friction-type clutches, while the torque-transmitting mechanisms C2, C3, C4 and C7 concentric with layshaft 54 may be synchronizers actuated by shift forks (not shown) as is understood by those skilled in the art. By placing friction-type clutches adjacent to one another on the same layshaft 52, fluid routing requirements are simplified, as hydraulic fluid flow to the clutches C1, C5 and C6 may be through mostly common feed channels. Simplifying the hydraulic feed channels and reducing the overall length of the feed channels simplifies production of the transmission 14 and may enable a smaller pump for the hydraulic system. Additionally, if only clutches C1, C5, C6 and C8 are friction-type clutches, then, according to the engagement chart of FIG. 2, discussed below, there would only be three open clutches in each speed ratio, limiting spin losses. Alternatively, torque-transmitting mechanisms C2, C3, C4 and C7 may also be friction-type clutches, or torque-transmitting mechanisms C2 and C7 may be single synchronizers and torque-transmitting mechanisms C3 and C4 may be a double-sided synchronizer. Torque-transmitting mechanisms C5 and C6 may also be a double-sided synchronizer. The use of synchronizers in lieu of clutches reduces spin losses. In other embodiments, the torque-transmitting mechanisms may be still different types of clutches.

The first torque-transmitting mechanism C1, also referred to as brake C1, is a stationary-type clutch selectively engagable to ground layshaft 52 to the stationary member 40, thereby holding gear 74 and ring gear member 24 stationary. The second torque-transmitting mechanism C2, also referred to as brake C2, is a stationary-type clutch selectively engagable to ground layshaft 54 to the stationary member 40, thereby holding gear 86, gear 90, intermediate member 50 and sun gear member 22 stationary. The third torque-transmitting mechanism C3, also referred to as clutch C3, is a rotating-type clutch selectively engagable to connect gear 80 for common rotation with layshaft 54. The fourth torque-transmitting mechanism C4, also referred to as clutch C4, is a rotating-type clutch selectively engagable to connect gear 82 for common rotation with the layshaft 54. The fifth torque-transmitting mechanism C5, also referred to as clutch C5, is a rotating-type clutch selectively engagable to connect gear 70 for common rotation with layshaft 52. The sixth torque-transmitting mechanism C6, also referred to as clutch C6, is a rotating-type clutch selectively engagable to connect gear 72 for common rotation with layshaft 52. The seventh torque-transmitting mechanism C7, also referred to as clutch C7, is selectively engagable to connect gear 84 for common rotation with layshaft 54. The eighth torque-transmitting mechanism C8, also referred to as clutch C8, is selectively engagable to connect input member 17 for common rotation with intermediate member 50.

As shown in the truth table of FIG. 2, the torque-transmitting mechanisms C1, C2, C3, C4, C5, C6, C7, and C8 are selectively engagable in combinations of two to provide up to thirteen forward speed ratios and a reverse speed ratio (listed as gear states). Numerical gear ratios corresponding with the speed ratios are listed in FIG. 2. The gear ratio is the ratio of the torque of the output member 19 to the torque of the input member 17. A speed ratio corresponds with each gear ratio. The speed ratio is the ratio of the speed of the input member 17 to the speed of the output member 19.

The third (2nd) and the eighth (8th) forward speed ratios are listed in brackets, as they are optional. The transmission 14 would be an eleven-speed transmission if neither of these speed ratios is available, or a twelve-speed transmission if only one of these two speed ratios is available.

The numerical gear ratios set forth in FIG. 2 result from the tooth counts establishing the following gear ratios. The gear ratio of the gear 70 and of the gear 80 to gear 60 is −0.67. The gear ratio of gear 72 and of gear 82 to gear 62 is −1.5. The gear ratio of gear 84 to gear 64 is +1.74. The gear ratio of gear 90 to gear 86 is −2.0. The gear ratio of gear 92 to gear 74 is −1.5. The gear ratio of ring gear member 24 to sun gear member 22 is −2.0, assuming the carrier member 26 is stopped (for purposes of calculation only).

With the tooth counts listed above, there are eleven underdrive speed ratios (1st to 11th), and one overdrive speed ratio (13th) that result in the ratio steps listed in FIG. 2. As is apparent in FIG. 2, the ratio steps are relatively even in the third (3rd) through the twelfth (12th) forward speed ratios, resulting in smooth shift feel and increased fuel efficiency as the engine 12 need only operate over a narrow range of speeds in each speed ratio. Other gear tooth counts and corresponding gear ratios may be selected to accomplish speed ratios and ratio steps advantageous to the particular transmission application. A person of ordinary skill in the art of transmission design would understand how to select desirable tooth counts.

To establish the reverse speed ratio (REV), brake C1 and clutch C7 are engaged. Because brake C1 is engaged, the ring gear member 24 is held stationary. Because clutch C7 is engaged, torque is transferred through intermeshing gears 64, 69, and 84 along layshaft 54, through intermeshing gears 86 and 90 to sun gear member 22, and though planetary gear set 20 to output member 19. The output member 19 rotates in an opposite direction from the input member 17.

To establish the first speed ratio (1st), brake C1 and clutch C4 are engaged. Because brake C1 is engaged, the ring gear member 24 is held stationary. Because clutch C4 is engaged, torque is carried from the input member 17 through intermeshing gears 62, 82 to layshaft 54, through intermeshing gears 86, 90 to sun gear member 22, and through planetary gear set 20 to output member 19. Input member 17 and output member 19 rotate in the same direction, as in all of the forward speed ratios.

To establish the second speed ratio (2nd), clutches C6 and C7 are engaged. Because clutch C6 is engaged, torque is carried from the input member 17 through intermeshing gears 62, 72 to layshaft 52, through intermeshing gears 74, 92 to ring gear member 24. Because clutch C7 is engaged, torque is carried from input member 17 through intermeshing gears 64, 69, 84 to layshaft 54, and intermeshing gears 86, 90 to sun gear member 22. Torque provided at sun gear member 22 is added to that provided at ring gear member 24 through the planetary gear set 20 to carrier member 26 and the output member 19. The shift from the first speed ratio to the second speed ratio is a double-transition shift.

To establish the third speed ratio (3rd), brake C1 and clutch C3 are engaged. Because brake C1 is engaged, the ring gear member 24 is held stationary. Because clutch C3 is engaged, torque is carried from the input member 17 through intermeshing gears 60, 80 to layshaft 54, through intermeshing gears 86, 90 to sun gear member 22, and through planetary gear set 20 to output member 19. The shift from the second speed ratio to the third speed ratio is a double-transition shift.

To establish the fourth speed ratio (4th), brake C2 and C6 are engaged. Because brake C2 is engaged, the sun gear member 22 is held stationary. Because clutch C6 is engaged, torque is carried from the input member 17 through intermeshing gears 62, 72 to layshaft 52, through intermeshing gears 74, 92 to ring gear member 24, through planetary gear set 20 to output member 19. The shift from the third speed ratio to the fourth speed ratio is a double-transition shift.

To establish the fifth speed ratio (5th), clutches C1 and C8 are engaged. Because clutch C1 is engaged, the ring gear member 24 is held stationary. Because clutch C8 is engaged, torque is transferred from the input member 17 to the intermediate member 50 and sun gear member 22. Torque is multiplied through planetary gear set 20 to the output member 19. The shift from the fourth speed ratio to the fifth speed ratio is a double-transition shift.

To establish the sixth speed ratio (6th), clutches C4 and C6 are engaged. Because clutch C4 is engaged, torque is carried from the input member 17 through intermeshing gears 62, 82 to layshaft 54, through intermeshing gears 86, 90 to sun gear member 22. Because clutch C6 is engaged, torque is carried from the input member 17 through intermeshing gears 62, 72 to layshaft 52, through intermeshing gears 74, 92 to ring gear member 24. Torque provided to sun gear member 22 is subtracted from torque provided to ring gear member 24, and torque flows through planetary gear set 20 to carrier member 26 and output member 19. The shift from the fifth speed ratio to the sixth speed ratio is a double-transition shift.

To establish the seventh speed ratio (7th), clutches C3 and C6 are engaged. Because clutch C3 is engaged, torque is carried from the input member 17 through intermeshing gears 60, 80 to layshaft 54, through intermeshing gears 86, 90 to sun gear member 22. Because clutch C6 is engaged, torque is carried from the input member 17 through intermeshing gears 62, 72 to layshaft 52, through intermeshing gears 74, 92 to ring gear member 24. Torque provided to sun gear member 22 is subtracted from torque provided to ring gear member 24, and torque flows through planetary gear set 20 to carrier member 26 and output member 19. The shift from the sixth speed ratio to the seventh speed ratio is a single-transition shift.

To establish the eighth speed ratio (8th), clutches C5 and C7 are engaged. Because clutch C5 is engaged, torque is carried from the input member 17 through intermeshing gears 60, 70 to layshaft 52, through intermeshing gears 74, 92 to ring gear member 24. Because clutch C7 is engaged, torque is carried from the input member 17 through intermeshing gears 64, 69, 84 to layshaft 54, through intermeshing gears 86, 90 to sun gear member 22. Torque provided to sun gear member 22 is added to torque provided to ring gear member 24, and torque flows through planetary gear set 20 to carrier member 26 and output member 19. The shift from the seventh speed ratio to the eighth speed ratio is a double-transition shift.

To establish the ninth speed ratio (9th), brake C2 and clutch C5 are engaged. Because brake C2 is engaged, the sun gear member 22 is held stationary. Because clutch C5 is engaged, torque is carried from the input member 17 through intermeshing gears 60, 70 to layshaft 52, through intermeshing gears 74, 92 to ring gear member 24, through planetary gear set 20 to output member 19. The shift from the eighth speed ratio to the ninth speed ratio is a single-transition shift.

To establish the tenth speed ratio (10th), clutches C4 and C5 are engaged. Because clutch C5 is engaged, torque is carried from the input member 17 through intermeshing gears 60, 70 to layshaft 52, through intermeshing gears 74, 92 to ring gear member 24. Because clutch C4 is engaged, torque is carried from the input member 17 through intermeshing gears 62, 82 to layshaft 54, through intermeshing gears 86, 90 to sun gear member 22. Torque provided to sun gear member 22 is subtracted from torque provided to ring gear member 24, torque flows through planetary gear set 20 to carrier member 26 and output member 19. The shift from the ninth speed ratio to the tenth speed ratio is a single-transition shift.

To establish the eleventh speed ratio (11th), clutches C3 and C5 are engaged. Because clutch C5 is engaged, torque is carried from the input member 17 through intermeshing gears 60, 70 to layshaft 52, through intermeshing gears 74, 92 to ring gear member 24. Because clutch C3 is engaged, torque is carried from the input member 17 through intermeshing gears 60, 80 to layshaft 54, through intermeshing gears 86, 90 to sun gear member 22. Torque provided to sun gear member 22 is subtracted from torque provided to ring gear member 24, and torque flows through planetary gear set 20 to carrier member 26 and output member 19. The shift from the tenth speed ratio to the eleventh speed ratio is a single-transition shift.

To establish the twelfth speed ratio (12th), clutches C5 and C8 are engaged. Because clutch C5 is engaged, torque is carried from the input member 17 through intermeshing gears 60, 70 to layshaft 52, through intermeshing gears 74, 92 to ring gear member 24. Because clutch C8 is engaged, torque is transferred from the input member 17 to the intermediate member 50 and sun gear member 22. Torque provided to sun gear member 22 is subtracted from torque provided to ring gear member 24, and torque flows through planetary gear set 20 to carrier member 26 and output member 19. The shift from the eleventh speed ratio to the twelfth speed ratio is a single-transition shift.

To establish the thirteen speed ratio (13th), clutches C6 and C8 are engaged. Because clutch C6 is engaged, torque is carried from the input member 17 through intermeshing gears 62, 72 to layshaft 52, through intermeshing gears 74, 92 to ring gear member 24. Because clutch C8 is engaged, torque is transferred from the input member 17 to the intermediate member 50 and sun gear member 22. Torque provided to sun gear member 22 is subtracted from torque provided at ring gear member 24 through planetary gear set 20 to carrier member 26 and output member 19. The shift from the twelfth speed ratio to the thirteenth speed ratio is a single-transition shift.

Although thirteen forward speed ratios are available, the transmission 14 may be controlled to operate with only some of the available forward speed ratios. For example, the transmission 14 may be configured to operate as a six-speed transmission, a seven-speed transmission, an eight-speed transmission, a nine-speed transmission, a ten-speed transmission, an eleven-speed transmission, or a twelve-speed transmission. The transmission 14 could also be operated with less than six forward speed ratios.

In one manner of operating the transmission 14 as a six-speed transmission, an algorithm stored in a controller that controls valves that direct hydraulic fluid flow to the torque-transmitting mechanisms may establish only the reverse speed ratio, and the second, fourth, sixth, seventh, eleventh, and twelfth forward speed ratios described above as first, second, third, fourth, fifth and sixth forward speed ratios. In such a six-speed transmission, there would be only single-transition shifts between the subsequent forward speed ratios. The transmission 14 could also be operated as a six-speed transmission with only single-transition shifts between subsequent speed ratios by establishing the reverse speed ratio, and the second, fourth, sixth, tenth, eleventh, and twelfth forward speed ratios described above as first, second, third, fourth, fifth and sixth forward speed ratios. Single-transition shifts are easier to time so that torque disturbances are not apparent and a smooth shift feel is maintained.

To operate the transmission 14 as a seven-speed transmission, the controller may establish only the reverse speed ratio, and the second, fourth, sixth, seventh, tenth, eleventh, and twelfth forward speed ratios described above as first, second, third, fourth, fifth, sixth and seventh forward speed ratios. In such a seven-speed transmission, there would be only one double-transition shift between the fourth and fifth forward speed ratios (i.e., between the seventh and tenth forward speed ratios of FIG. 2) and the remaining shifts would be single-transition shifts.

To operate the transmission 14 as an eight-speed transmission, all of the forward speed ratios described for the seven speed transmission would be utilized, as well as the eighth forward speed ratio of FIG. 2. The eight-speed transmission would have only one double-transition shift between the fourth and fifth forward speed ratios (i.e., between the seventh and eighth forward speed ratios of FIG. 2) and the remaining shifts would be single-transition shifts.

To operate the transmission 14 as a nine-speed transmission, all of the forward speed ratios described for the eight speed transmission would be utilized, as well as the ninth forward speed ratio of FIG. 2. The nine-speed transmission would have only one double-transition shift between the fourth and fifth forward speed ratios (i.e., between the seventh and eighth forward speed ratios of FIG. 2) and the remaining shifts would be single-transition shifts.

The powertrain 10 may share components with a hybrid vehicle, and such a combination may be operable in a "charge-depleting mode". For purposes of the present invention, a "charge-depleting mode" is a mode wherein the vehicle is powered primarily by an electric motor/generator such that a battery is depleted or nearly depleted when the vehicle reaches its destination. In other words, during the charge-depleting mode, the engine 12 is only operated to the extent necessary to ensure that the battery is not depleted before the destination is reached. A conventional hybrid vehicle operates in a "charge-sustaining mode", wherein if the battery charge level drops below a predetermined level (e.g., 25%) the engine is automatically run to recharge the battery. Therefore, by operating in a charge-depleting mode, the hybrid vehicle can conserve some or all of the fuel that would otherwise be expended to maintain the 25% battery charge level in a conventional hybrid vehicle. It should be appreciated that a hybrid vehicle powertrain is preferably only operated in the charge-depleting mode if the battery can be recharged after the destination is reached by plugging it into an energy source.

While the best modes for carrying out the invention have been described in detail, those familiar with the art to which this invention relates will recognize various alternative designs and embodiments for practicing the invention within the scope of the appended claims.

The invention claimed is:
1. A multi-speed transmission comprising:
an input member;
an output member;
a stationary member;
an intermediate member;
a simple planetary gear set;
wherein the input member, the output member, the intermediate member, and the simple planetary gear set are arranged coaxially with one another to define a first axis of rotation;
a first and a second layshaft defining a second axis of rotation and a third axis of rotation, respectively;
eight selectively engagable torque-transmitting mechanisms;
five sets of intermeshing gears, each set of intermeshing gears being axially spaced from the other sets of intermeshing gears;
wherein a first and a second of the five sets of intermeshing gears each include a respective gear continuously connected for common rotation with the input member, a respective gear rotatable about the first layshaft and a respective gear rotatable about the second layshaft;
wherein a third of the five sets of intermeshing gears includes a first gear continuously connected for common rotation with the input member, a second gear rotatable about the second layshaft, and a third gear meshing with both the first gear and the second gear;
wherein a fourth of the five sets of intermeshing gears includes a first gear continuously connected for common rotation with the second layshaft and a second gear meshing with the first gear of the fourth of the five sets of intermeshing gears; and continuously connected for common rotation with the intermediate member;

wherein a fifth of the five sets of intermeshing gears includes a first gear continuously connected for common rotation with the first layshaft, and a second gear meshing with the first gear of the fifth of the five sets of intermeshing gears; and continuously connected for common rotation with a member of the simple planetary gear set;

wherein one of the eight torque-transmitting mechanisms is selectively engagable to connect the input member for common rotation with the intermediate member, and the other seven of the eight torque-transmitting mechanisms are each selectively engagable to connect a respective gear of the sets of intermeshing gears to a respective one of the layshafts or to the stationary member; and wherein the eight torque-transmitting mechanisms are engagable in different combinations to establish multiple forward speed ratios and a reverse speed ratio between the input member and the output member.

2. The multi-speed transmission of claim 1, wherein the simple planetary gear set has a first member continuously connected for common rotation with the intermediate member, a second member continuously connected for common rotation with the output member, and a third member continuously connected for common rotation with the second gear of the fifth of the five sets of intermeshing gears.

3. The multi-speed transmission of claim 1, wherein a first and a second of the eight torque-transmitting mechanisms are selectively engagable to ground the first and the second layshafts to the stationary member, respectively.

4. The multi-speed transmission of claim 1, wherein two of the eight torque-transmitting mechanisms are respectively selectively engagable to connect a respective one of the gears of the first and the second of the five sets of intermeshing gears rotatable about the first layshaft for common rotation with the first layshaft; and wherein two of the eight torque-transmitting mechanisms are respectively selectively engagable to connect a respective one of the gears of the first and the second of the five sets of intermeshing gears rotatable about the second layshaft for common rotation with the second layshaft.

5. The multi-speed transmission of claim 1, wherein one of the eight torque-transmitting mechanisms is selectively engagable to connect the second gear of the third of the five sets of intermeshing gears for common rotation with the second layshaft.

6. The multi-speed transmission of claim 1, wherein at least some of the eight torque-transmitting mechanisms are synchronizers.

7. The multi-speed transmission of claim 6, wherein four of the eight torque-transmitting mechanisms are coaxial about the third axis of rotation and are synchronizers; wherein another three of the eight torque-transmitting mechanisms are coaxial about the second axis of rotation and are rotating or stationary friction clutches; and wherein the one of the eight torque-transmitting mechanisms selectively engagable to connect the input member for common rotation with the intermediate member is a friction clutch.

8. The multi-speed transmission of claim 7, wherein the eight torque-transmitting mechanisms are engagable in combinations of two such that at least one different one of the friction clutches is engaged in each of the forward speed ratios and in the reverse speed ratio.

9. The multi-speed transmission of claim 1, wherein the eight torque-transmitting mechanisms are engagable in different combinations of two to establish six forward speed ratios and the reverse speed ratio between the input member and the output member with all shifts between subsequent forward speed ratios being single-transition shifts.

10. The multi-speed transmission of claim 1, wherein the eight torque-transmitting mechanisms are engagable in different combinations of two to establish seven forward speed ratios and the reverse speed ratio between the input member and the output member with only one shift between subsequent forward speed ratios being a double-transition shift and remaining shifts between subsequent forward speed ratios being single transition shifts.

11. The multi-speed transmission of claim 1, wherein the eight torque-transmitting mechanisms are engagable in different combinations of two to establish eight forward speed ratios and the reverse speed ratio between the input member and the output member with only one shift between subsequent forward speed ratios being a double-transition shift and remaining shifts between subsequent forward speed ratios being single transition shifts.

12. The multi-speed transmission of claim 1, wherein the eight torque-transmitting mechanisms are engagable in different combinations of two to establish nine forward speed ratios and the reverse speed ratio between the input member and the output member with only one shift between subsequent forward speed ratios being a double-transition shift and remaining shifts between subsequent forward speed ratios being single transition shifts.

13. The multi-speed transmission of claim 1, wherein the eight torque-transmitting mechanisms are engagable in different combinations of two to establish thirteen forward speed ratios and the reverse speed ratio between the input member and the output member.

14. The multi-speed transmission of claim 1, wherein the eight torque-transmitting mechanisms include two brakes and six rotating-type clutches.

15. A multi-speed transmission comprising:
an input member;
an output member;
a stationary member;
an intermediate member;
a simple planetary gear set having a sun gear member, a ring gear member, a carrier member, and a set of pinion gears supported for rotation by the carrier member and meshing with both the sun gear member and the ring gear member; wherein the input member, the output member, the intermediate member, and the simple planetary gear set are arranged coaxially with one another to define a first axis of rotation;
a first and a second layshaft defining a second axis of rotation and a third axis of rotation, respectively;
eight selectively engagable torque-transmitting mechanisms including two brakes and six rotating-type clutches;
five sets of intermeshing gears, one of which is arranged to transfer torque from the input member to the first layshaft, one of which is arranged to transfer torque from the input member to the second layshaft, one of which is arranged to transfer torque from the second layshaft to the intermediate member; one of which is arranged to transfer torque from the first layshaft to the planetary gear set; each set of intermeshing gears being axially spaced from the other sets of intermeshing gears;
wherein the sun gear member is connected for common rotation with the intermediate member, the carrier member is connected for common rotation with the output member, and the ring gear member is connected for common rotation with a member of one of the sets of intermeshing gears;

wherein the eight torque-transmitting mechanisms include one torque-transmitting mechanism selectively engagable to connect the input member for common rotation with the intermediate member, and seven torque-transmitting mechanisms that are each selectively engagable to connect a respective gear of the sets of intermeshing gears to a respective one of the layshafts or to the stationary member; and wherein the eight torque-transmitting mechanisms are engagable in different combinations of two to establish up to thirteen forward speed ratios and a reverse speed ratio between the input member and the output member.

16. The multi-speed transmission of claim 15, wherein the eight torque-transmitting mechanisms are selectively engagable to establish up to nine of the thirteen forward speed ratios with only one shift between subsequent ones of the nine of the thirteen forward speed ratios being a double-transition shift and remaining shifts between subsequent ones of the nine of the thirteen forward speed ratios being single-transition shifts.

17. The multi-speed transmission of claim 15, wherein a first and a second of the eight torque-transmitting mechanisms are selectively engagable to ground the first and the second layshafts to the stationary member, respectively.

18. The multi-speed transmission of claim 15, wherein a third of the five sets of intermeshing gears includes a first gear continuously connected for common rotation with the input member, a second gear rotatable about the second layshaft, and a third gear meshing with both the first gear and the second gear.

* * * * *